(12) United States Patent
Kashiwagi et al.

(10) Patent No.: US 8,896,959 B1
(45) Date of Patent: Nov. 25, 2014

(54) MAGNETIC DISK APPARATUS AND DATA RECORDING METHOD

(71) Applicant: Kabushiki Kaisha Toshiba, Tokyo (JP)

(72) Inventors: Kazuto Kashiwagi, Yokohama (JP);
Takeyori Hara, Kawasaki (JP);
Takayuki Kawabe, Sagamihara (JP);
Masahiro Kanamaru, Kawasaki (JP);
Takuji Matsuzawa, Kashiwa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/275,614

(22) Filed: May 12, 2014

Related U.S. Application Data

(60) Provisional application No. 61/941,276, filed on Feb. 18, 2014.

(51) Int. Cl.
*G11B 21/02* (2006.01)
*G11B 5/02* (2006.01)
*G11B 5/012* (2006.01)
*G11B 5/56* (2006.01)

(52) U.S. Cl.
CPC . *G11B 5/56* (2013.01); *G11B 5/012* (2013.01)
USPC .............................. 360/75; 360/55

(58) Field of Classification Search
None
See application file for complete search history.

(56) References Cited

U.S. PATENT DOCUMENTS

| 4,725,902 | A | * | 2/1988 | Oda et al. ............ 360/72.1 |
|---|---|---|---|---|
| 2004/0190188 | A1 | | 9/2004 | Zaitsu |
| 2012/0162814 | A1 | | 6/2012 | Kimizuka |
| 2012/0307400 | A1 | * | 12/2012 | Kawabe ............ 360/77.01 |
| 2013/0027801 | A1 | | 1/2013 | Kumar et al. |
| 2013/0027806 | A1 | * | 1/2013 | Cho ............... 360/75 |
| 2014/0118857 | A1 | * | 5/2014 | Kashiwagi et al. ........ 360/75 |

FOREIGN PATENT DOCUMENTS

| JP | 2007-115324 | 5/2007 |
|---|---|---|
| JP | 41-48812 B2 | 9/2008 |
| JP | 2012-138157 | 7/2012 |
| JP | 2012-239489 | 10/2012 |
| JP | 2012-252732 | 12/2012 |

* cited by examiner

*Primary Examiner* — Thang Tran
(74) *Attorney, Agent, or Firm* — Knobbe Martens Olson & Bear, LLP

(57) ABSTRACT

According to one embodiment, a magnetic disk apparatus includes a magnetic disk having a plurality of tracks, each of the plurality of tracks having a plurality of servo areas and a plurality of data areas, the plurality of servo areas and the plurality of data areas being alternately arranged respectively, a magnetic head, and a processor. When a plurality of positioning errors related to one servo area are present in the first track, the processor updates the positioning error of the one servo area with a positioning error closest to a second track that is next to the first track. The processor writes data in the second track by a shingled write recording system by using the updated positioning error.

18 Claims, 4 Drawing Sheets

FIG. 2

| | Servo0 | Servo1 | Servo2 | Servo3 | Servo4 | Servo5 | Servo6 | Servo7 | Servo8 | Servo9 |
|---|---|---|---|---|---|---|---|---|---|---|
| Track X | s00 | s01 | s02 | s03 | s04 | s05 | s06 | s07 | s08 | s09 |
| Track X+1 | s10 | - | - | s13 | s14 | s15 | s16 | s17 | s18 | s19 |

FIG. 3

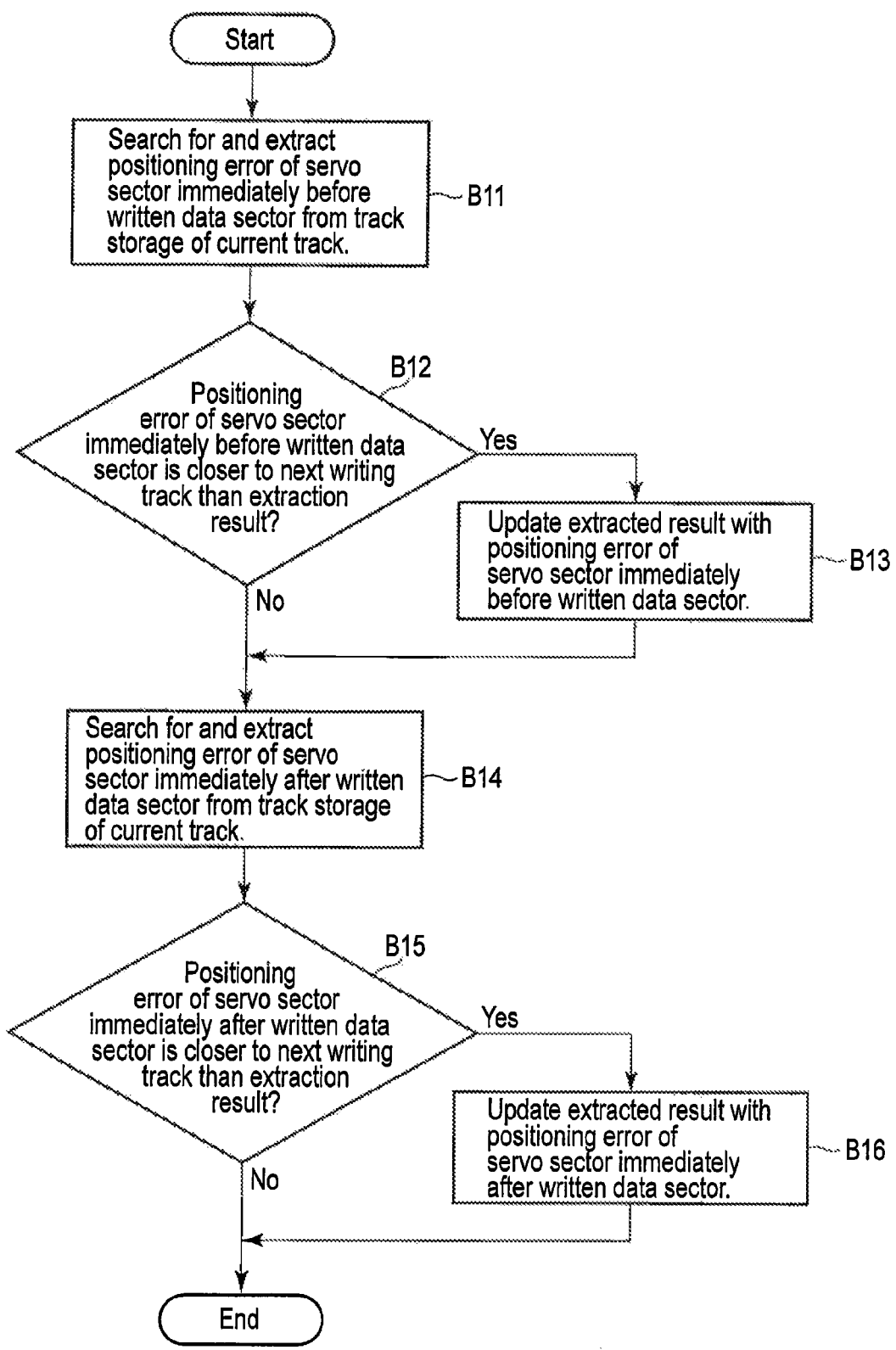
F I G. 5

MAGNETIC DISK APPARATUS AND DATA RECORDING METHOD

CROSS-REFERENCE TO RELATED APPLICATIONS

This application claims the benefit of U.S. Provisional Application No. 61/941,276, filed Feb. 18, 2014, the entire contents of which are incorporated herein by reference.

FIELD

Embodiments described herein relate generally to a magnetic disk apparatus and a data recording method.

BACKGROUND

Recently, techniques for writing tracks on a magnetic disk at high density have been developed. For example, as one of the techniques, a technique of shingled write recording is known. In this technique, tracks are partially overlapped to be written. By the technique of shingled write recording, tracks can be written at high density. Thus, the recording capacity can be increased.

In order to write tracks at high density, the tracks are required to be written with high accuracy. By writing tracks with high accuracy, for example, it is possible to prevent the data of the tracks which have been already written from being overwritten or destroyed.

Since data is written in a track by a write head, positioning error of the write head needs to be decreased in order to write data with high accuracy. However, it is difficult to reduce the positioning error of the write head dramatically compared with the past because the positioning error of the write head is influenced by disturbance, etc.

In a case where a track has been written, deviating from the desired position, this written track is required to be rewritten. By rewriting the track, a track which has been already written may be destroyed, or the writing speed may be decreased. Thus, the positioning the write head is required to be determined with high accuracy at the time of writing data.

BRIEF DESCRIPTION OF THE DRAWINGS

FIG. 2 shows positional relationships between data sectors $D_n$ and servo sectors $S_{yy}$.

FIG. 3 shows an example of a positioning error table.

FIG. 5 is a flowchart showing operations of a second embodiment.

DETAILED DESCRIPTION

Various embodiments will be described hereinafter with reference to the accompanying drawings.

In general, according to one embodiment, a magnetic disk apparatus comprises: a magnetic disk having a plurality of tracks, each of the plurality of tracks comprising a plurality of servo areas including position information and a plurality of data areas, the plurality of servo areas and the plurality of data areas being alternately arranged respectively; a magnetic head for writing and reading data relative to the magnetic disk; and a processor. When recording data in a data area of a first track, by reading the position information of the servo areas of the first track by the magnetic head, the processor detects a positioning error indicating difference from a target writing position of the first track for each of the servo areas. The processor stores the detected positioning error for each of the servo areas in a storage portion. When a plurality of positioning errors related to one servo area are present in the positioning errors of the first track in the storage portion, the processor updates the positioning error of the one servo area with a positioning error closest to a second track that is next to the first track. The processor writes data in the second track by a shingled write recording system by using the updated positioning error.

First Embodiment

Figure 1:
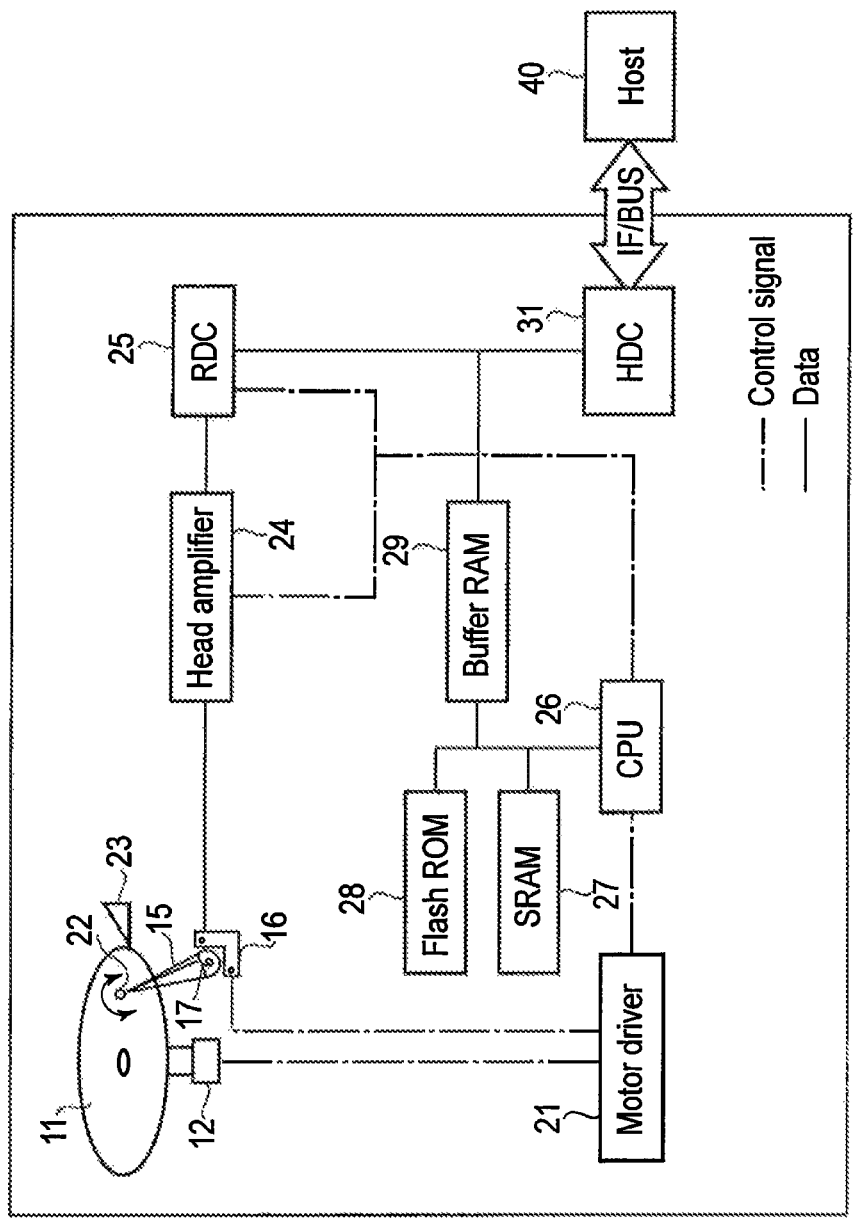
FIG. 1 is a block diagram showing a structure of a magnetic disk apparatus according to an embodiment.

FIG. 1 is a block diagram showing a structure of a magnetic disk apparatus 1 according to an embodiment.

The magnetic disk apparatus 1 of the embodiment comprises, as an outline structure, inside a housing (not shown in the figure), a magnetic disk 11, a spindle motor (SPM) 12 which rotates the magnetic disk 11, a magnetic head 22, an actuator arm 15, a voice coil motor (VCM) 16 and a ramp 23, etc.

In the magnetic disk 11, a plurality of tracks are concentrically defined, and each track has a plurality of servo sectors including position information and a plurality of data sectors including data areas. The magnetic disk 11 is rotated by the SPM 12. The actuator arm 15 is rotatably attached to a pivot 17. The magnetic head 22 is attached to an end of the actuator arm 15. The VCM 16 is connected to the other end of the actuator arm 15. The VCM 16 rotates the actuator arm 15 on the basis of the pivot 17, and the position of the magnetic head 22 is determined in a state where the magnetic head 22 is floated at an arbitrary radial position of the magnetic disk 11.

As shown in FIG. 1, the magnetic disk apparatus 1 of this embodiment comprises, as an electronic hardware structure, a motor driver 21, a head amplifier 24, a read/write channel (RDC) 25, a hard disk controller (HDC) 31, a central processing unit (CPU) 26, a random access memory (SRAM) 27 which is a memory for operations, a flash read only memory (ROM) 28 which is a nonvolatile memory and a buffer RAM 29 for temporary storage.

In response to an instruction from the CPU 26, the motor driver 21 drives the SPM 12 in order to rotate the magnetic disk 11 around the rotation axis at the predetermined rotation speed. Further, in response to an instruction from the CPU 26, the motor driver 21 drives the VCM 16 in order to move the magnetic head 22 which is provided at the fore end of the actuator arm 15 in the radial direction of the magnetic disk 11.

The magnetic head 22 writes data in the magnetic disk 11 and reads the data written in the magnetic disk 11.

In the conventional technique for positioning of the head of a hard disk drive (HDD), the target position of the positioning is naturally fixed in the predetermined track center (central position in the radial direction of a track). A positioning error indicating an error between the actual written track center (central position in the radial direction of the actually-recorded track) and the predetermined track center has distribution. Positioning errors are mainly classified into two types, which are repeatable positioning errors (repeatable run out) and non-repeatable positioning errors (non-repeatable run out).

The sum of the two types of errors is normally distributed in a macroscopic manner. When the standard deviation of positioning error distribution is $\sigma_{pos}$=s [nm], from additivity of variance, the standard deviation of distribution of distance between two adjacent tracks is $\sigma_{tp}=\sqrt{2}\cdot s$, which is larger distribution than the original positioning error.

Here, this specification considers the influence of adjacent writing track erase relative to a width of the written track. In other words, this specification studies the frequency and distribution of narrowing of written tracks. In the conventional recording system which is not the shingled write recording, an adjacent writing sequence is not constant (adjacent tracks on the both sides are randomly written). Therefore, by determining the head position relative to the predetermined track center, the actual writing track width is most certainly assured. In the shingled write recording using the conventional technique, the distance between two adjacent tracks is substantially the track width of the written track. In sum, relative to raw competent a of the positioning error, the standard deviation of the dispersion of the written track width is root 2 times larger. Thus, the frequency of narrowing is high.

In the shingled write recording system, for example, in the same servo frame of the first and second tracks adjacent to each other, when the positioning error of the first track is generated in the second track direction, and the positioning error of the second track is generated in the first track direction, the width of the first track is narrowed. If this narrowed amount is large, there is a high possibility that the written data of the first track is overwritten or deleted by the data of the second track at the narrow segment. The first method for preventing this narrowing is as follows: when the positioning error or the narrowed amount is larger than the predetermined value, or when the actual track width is less than the predetermined width by calculating the actual track width from the narrowed amount and the designed track width (target track pitch), the writing of the writing target data sector is stopped. The second method for preventing the narrowing is as follows: the target position of positioning the head in each servo sector of the track which is about to be written is changed by using the positioning error information of a written track so that the track width can be constant. As a result, the target position of positioning the head of the track which is newly written is parallel with the written track.

Thus, by correcting the writing target track by the positioning error of the written track, data is written in such a way that portions having a possibility of local narrowing by the positioning error are "avoided", or the track width of portions having room is "efficiently narrowed". In this manner, it is possible to restrain the dispersion of track width. Statistically, when the positioning errors are normally distributed and the standard deviation is $\sigma=s$, the standard deviation of narrowing amount in the conventional technique is $\sqrt{2}\cdot s$ from additivity of variance. This standard deviation can be suppressed at "s" at the highest by applying the second method which prevents narrowing. In this manner, narrowing is statistically reduced.

In common with the first and second methods for preventing narrowing, the accurate storage and use of the positioning for writing track (positioning error) are the basic premise of the prevention of track narrowing. However, the conventional technique does not disclose the accurate storage or use of the positioning for writing track.

FIG. 2 shows positional relationships between data sectors and servo sectors included in each of a plurality of tracks defined on the magnetic disk of this embodiment. Now, this specification explains operations of the shingled write recording system with reference to FIG. 2. These operations are attained when the CPU 26 reads and executes the program stored in the flash ROM 28 or the magnetic disk 11. However, these operations can be also executed by structuring dedicated hardware.

FIG. 2 illustrates Dn indicating a data sector area for recording data corresponding to logical block address (LBA) n, and illustrates sxy indicating a servo sector area in which the radial position information of servo cylinder number x and frame number y is recorded in advance by a servo writer, etc. In the figure, for ease, the magnetic disk is designed to have ten data sectors and servo sectors in one track and have a track skew of two sectors between adjacent tracks for waiting for the rotational time. In general, the top data sector (the newest address data) of each track of a hard disk drive (HDD) is physically shifted by a certain number of sectors for waiting for waiting time for the positioning between tracks (=rotational time). This shift is called a track skew, and is set at two sectors in the example of FIG. 2. This track skew corresponds to, for example, data sectors D18 and D19 in FIG. 2.

FIG. 3 shows an example of a positioning error table 32. The positioning error table 32 is a table showing the difference (positioning error) between the predetermined target track and the actual track in each servo sector. This table 32 is structured in, for example, the SRAM 27 under control of the CPU 26. Servo0, Servo1, . . . are the numbers of servo frames. In the portions of s00, s01, . . . , the positioning errors detected by reproducing each servo sector are stored. In the positioning error table 32, for example, when the storage of track X+1 is completed, the information of the line of track X (first line) is deleted, and the information of the line of track X+1 (second line) is shifted to the first line. In the second line, the positioning error of track X+2 is stored. Here, the table structure immediately after the head 22 goes round one track of track X+1 of FIG. 2 is shown. The portions of "–" are indefinite, and data will be stored later in these portions.

Here, this specification explains a storage process of the positioning error table 32 at the time of writing data of D00 to D09 in FIG. 2. When D00 is written, the positioning error detected by reading s00 by the magnetic head 22 most reflects the positional error information (positioning error) in the radial direction of the top portion in D00. Therefore, the CPU 26 stores the radial positional error information of s00 as the first element in the positioning error table 32. Thus, the CPU 26 detects the positioning error showing the difference from the target writing position of a written track by reproducing each servo sector by the magnetic head 22, and stores the positioning error in the positioning error table 32 as the positioning error of each servo sector.

Since the radial positional error information detected by reproducing s01 most reflects the radial positional error information of the end portion in D00, the CPU 26 stores the radial positional error information of s01 in the positioning error table 32 as the second element. If the positioning error observed in servo sector sxy at the time of writing data in data sector Dn is expressed as sxy@Dn, the storage elements of the positioning error table 32 immediately after the radial positional error information of s01 is reproduced after D00 is written are the following two elements: {s00@D00, s01@D00}.

Next, this specification considers a case of writing D01 without waiting for the rotation immediately after s01 is reproduced and a positional error signal is obtained. At this time, in consideration of s01@D00=s01@D01, the storage elements of the positioning error table 32 immediately after the radial positional error information of s02 is reproduced after D01 is written are the following three elements: (s00@D00, s01@D00(=s01@D01), s02@D01).

Further, when writing is continuously performed until D08 without waiting for the rotation in this manner, the storage elements of the positioning error table 32 immediately after the radial positional error information of s09 is reproduced after D08 is written are the following ten elements: {s00@D00, s01@D00(=s01@D01), s02@D1(=s02@D02), s03@D02(=s03@D03), s04@D03(=s04@D04), s05@D04(=s05@D05), s06@D05(=s06@D06), s07@D06(=s07@D07), s08@D07(=s08@D08), s09@D08(=s09@D09)}.

Further, the storage elements of the positioning error table 32 immediately after the radial positional error information of s00 is reproduced again after the last sector D09 of the track is written are the following eleven elements: {s00@D00, s01@D00(=s01@D01), s02@D01(=s02@D02), s03@D02(=s03@D03), s04@D03(=s04@D04), s05@D04(=s05@D05), s06@D05(=s06@D06), s07@D06(=s07@D07), s08S@D7(=s08@D08), s09@D08(=s09@D09), s00@D09}.

For example, in track X shown in FIG. 2, two servo sectors s00 at the left and right ends are illustrated for convenience sake although these servo sectors are the same servo sector. Positioning error s00@D09 detected by reproducing s00 after D09 is written is stored in the positioning error table 32 together with positioning error s00@D00 of the top portion of D00.

Here, the use of the storage elements of the positioning error table 32 at the time of continuously writing sectors D10 to D19 of the next track is particularly considered. First, positioning errors s02@D02 and s03@D02 corresponding to D02 which is the written data sector adjacent to D10 are used in order to write D10. Specifically, according to the first method for preventing the narrowing, the CPU 26 swiftly compares the positioning errors of s12@D10 and s02@D02 and performs adjacency determination (track width calculation) of the positioning errors of s12@D10 and s02@D02 as soon as the positioning error of s12@D10 is reproduced. That is, the CPU 26 calculates the track width of the writing target data sector D10 of the next track based on the positioning error of the written track (track X) stored in the positioning error table 32, the target track pitch and the positioning error of the track (track X+1) which is currently written. Further, the comparison and adjacency prediction determination between the prediction position of s13@D10, which is predicted from s11@D19, before s11@D19 and s12@D10, and s03@D2 are implemented. For example, when measurement results are s11@D19=+1 nm and s12@D10-+3 nm, s13@D10 is predicted as +5 nm. When the adjacency beyond a predetermined value occurs (the track width does not satisfy the predetermined appropriate value), the CPU 26 immediately stops the writing of D10. Alternatively, when the adjacency beyond a predetermined value is predicted, the CPU 26 stops the writing of D10 before happens. In this manner, the erase of D02 due to adjacency (drift off) of D10 to D02 is prevented. What should be noted here is that the latter prevention based on the adjacency prediction determination is more effective than the former one for the following reason: constant erase could happen due to the waste time for reproducing positioning errors in the after-the-fact prevention based on the adjacency determination; on the other hand, the erase is prevented before happens in the latter prevention based on the adjacency prediction determination.

Alternatively, according to the second method for preventing the narrowing, the CPU 26 prevents the adjacency of D10 to D02 before happens by setting the target radial position of S12@D10 based on s02@D02 and setting the target radial position of s13@D10 based on s03@D02. In this manner, the CPU 26 searches for the positioning error information of the written track (track X) stored in the positioning error table 32, calculates the correction amount of the writing target radial position of the writing target data sector (D10) of the writing target track (track X+1) which is away from the written track by a predetermined distance in parallel with the written track and which will be newly written, and sets the target radial position. Similarly, target radial positions are set by using s03@D03 and s04@D03 in the writing of D11, s04@D04 and s05@D04 in the writing of D12, s05@D05 and s06@D05 in the writing of D13, s06@D06 and s07@D06 in the writing of D14, s07@D07 and s08@D07 in the writing of D15, and s08@D08 and s09@D08 in the writing of D16 respectively.

Here, the use of the positioning errors stored in the positioning error table 32 related to the writing of D17 and D18 should be considered. In servo sector s00 adjacent to the servo sector immediately after D17 or immediately before D18, there are two positioning errors of s00@D09 and s00@D00 with respect to one servo sector s00. Therefore, a problem is caused in the writing of D17 and D18 using the positioning error of servo sector s00 for data writing. In order to explain this problem in an understandable way, the writing of D00 is used as an example below.

In order to prevent the adjacency of D18 to D00; in other words, the deletion or overwriting of D00 by D18 before happens, the positioning error s00@D00 detected in the servo sector immediately before D00 is needed. However, when D09 was written, the second positioning error s00@D09 which is different from s00@D00 is generated in s00.

When s00@D09 is adopted from the two encountering positioning errors, it is impossible to prevent the adjacency of D18 to D00 before happens in the first method for preventing the narrowing since s00@D00 which is the positioning error of D00 is lost or cannot be used. In the second method for preventing the narrowing, since the follow-up defect is caused due to the control delay time relative to the discontinuity of target radial positions, unintended target correction could happen in the writing track of D18 which could overwrite D00, or correction could be insufficient, or in the worst case, D18 could erase D00. In sum, similarly to the first method, D00 could be erased by D18 as s00@D00 indicating the positioning error of D00 is not adopted. On the other hand, when s00@D00 is adopted, similarly, these problems could be exposed relative to D09. In sum, D17 could erase D09. In order to solve these problems, it is necessary to appropriately determine which one of s00@D00 and s00@D09 is the track storage (positioning error) closer to D17 or D18 which is about to be written.

Figure 4:
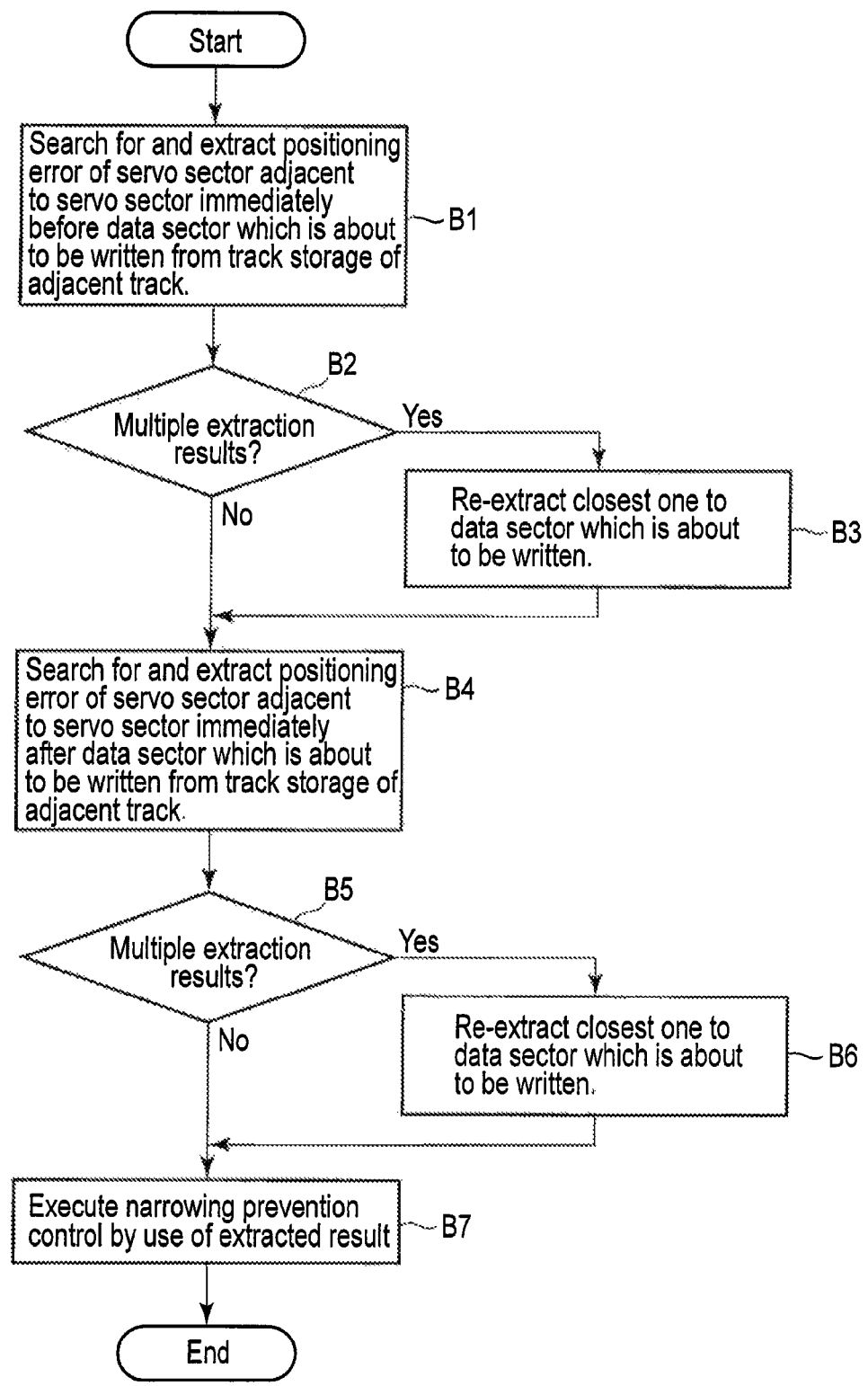
FIG. 4 is a flowchart showing operations of a first embodiment.

In the first embodiment, the technique of implementing the aforementioned determination at the time of data sector writing is disclosed. FIG. 4 is a flowchart showing the operations of the first embodiment. Here, this specification describes the embodiment, employing, as a sample case, the time point immediately after the writing of D00 to D16 has been finished and s19@D16(=s19@D17) has been obtained.

First, the CPU 26 obtains extraction result s09@D09 by searching for the positioning error of servo sector s09 which is adjacent to servo sector s19 provided immediately before D17 from the track storage (positioning error of track X in the positioning error table 32) of the track which is adjacent to D17 which is about to be written (block B1). Next, relative to s09, whether there is one extraction result or there are multiple extraction results is confirmed (block B2). If there are multiple extraction results (Yes in block B2), the positioning error indicating the position which is the closest to D17 or the track including D017 which is about to be written is re-extracted (block B3). Specifically, from multiple positioning errors, the positioning error indicating the position which is the closest to the radial position calculated based on the positioning error reproduced in s19 immediately before D17 at the time of writing D17 is re-extracted.

For example, when writing of s09 has to be stopped due to shock detection, etc., s09 is rewritten. When the shock is detected continuously, s09 could be written multiple times. However, in this embodiment, since the extraction result is only s09@D09, this re-extraction (block B3) is not implemented. When there is one extraction result (No in block B2), the step moves to block 84.

In block B4, the CPU 26 searches for the positioning error of servo sector s00 which is adjacent to servo sector s10 provided immediately after D17 from the track storage (positioning errors) of track X which is adjacent to D17, and obtains extraction result {s00@D09, s00@D00}. Next, the CPU 26 confirms whether there are multiple extraction results or there is one extraction result (block B5). If there are multiple extraction results, the CPU 26 re-extracts the positioning error indicating the position which is the closest to D17 or the track including D17 which is about to be written (block B6).

In this embodiment, multiple extraction results {s00@D09, s00@D00} are present. Therefore, from s00@D09 and s00@D00, the CPU 26 re-extracts positioning error information s00@D0z which is the closest to D17 or the track including D17. Specifically, the CPU 26 re-extracts positioning error information s0@D0z which is the closest to the radial position calculated based on s19@D17 and its target track radius as described above. When one extraction result is present (No in block B5), the process transfers to block B7.

In block B7, the CPU 26 executes narrowing prevention control by the aforementioned first or second method by using result {09@D09, s00@D0z} extracted in the above-described manner.

As described above, when there are multiple positioning errors of a servo sector (s00 in this example) provided at one end of a data sector (D09) which is in the written track (track X) and which is adjacent to a writing target data sector (D17) of the writing target track (track X+1) in the positioning error table 32, the CPU 26 adopts the positioning error which is closer to the writing target data sector (D17) of the writing target track (the radial position determined by reproducing s19 at the time of writing D17) from the multiple positioning errors. In this manner, the CPU 26 executes the narrowing prevention control.

As explained above, according to this embodiment, the effect of reducing the possibility of erasing the written information is obtained by adopting the track (positioning error) which is the closest to the data sector which is about to be written from a plurality of written tracks (positioning errors) detected in one servo sector and stopping the writing or correcting the radial position of the track which is about to be written.

Second Embodiment

In the second embodiment, the technique of implementing the aforementioned determination at the time of storing the track storage (positioning error) is disclosed. FIG. 5 is a flowchart showing the operations of the second embodiment. Here, this specification describes the embodiment, explaining, as a sample case, the time point immediately after the writing of D00 to D09 has been finished and s09@D09 and s00@D09 have been obtained in FIG. 2.

First, the CPU 26 searches for and extracts the positioning error of the servo sector immediately before the written data sector D09 from the track storage (the positioning errors of track X) of the current track (block B11). In this case, s09@D08 is extracted. Next, the CPU 26 compares the extracted positioning error s09@D08 with the positioning error s09@D09 of the servo sector immediately before written data sector D09, and determines whether s09@D09 is closer to the next writing track than the extraction result s09@D08 (block B12).

When D08 and D09 are written in a continuous manner in the same track as described above, these positioning errors are the same value, and the necessity of update is not caused in general. However, for example, when D08 and D09 are not continuous because of multi-stream or shock detection, etc., these values could be unequal to each other. Here, the state in which multiple items of streaming user data each of which is continuous (recording data of TV programs, etc.,) are simultaneously input is multi-stream. At the time of multi-stream, multiple items of streaming user data are written in radial positions which are different from each other in a time-division manner in multiple shingled write recording units (bands=areas each consisting of several hundreds of tracks). At this time, even in the state where one shingled write recording unit is not all written, there is a possibility of stopping writing at a middle point of the shingled write recording unit, starting the interruption data writing in a completely different shingled write recording unit in the disk and restarting writing from the middle point of the stopped shingled write recording unit after the interruption data writing process is finished. The shock detection refers to an event of detecting shock by an acceleration sensor as described above. In this case, similarly, writing is suspended, and is restarted later. In common with the time of multi-stream and shock detection, discontinuity might be caused in the data writing in the same track.

When the writing of D08 and D09 is discontinuous because of the above reasons, s09@D09 is not equal to s09@D08, and s09@D09 is closer to the track which is written next than s09@D08 (Yes in block B12), the CPU 26 overwrites or renews s09@D08 by s09@D09 in the positioning error table 32 (block 813). When the positioning error s09@D09 of the servo sector immediately before the written data sector D09 is not closer to the track which is written next than the extraction result s09@D08 (No in block B12), the process transfers to block B14.

In block B14, the CPU 26 searches for and extracts the positioning error of servo sector s00 immediately after the written data sector D09 from the track storage of the current track. In this case, s00@D00 is extracted. Next, the CPU 26 compares the extracted positioning error s00@D00 with the positioning error s00@D09 of the servo sector immediately after written data sector D09, and determines whether s00@D09 is closer to the next writing track than the extraction result s00@D00 (block B15).

In this case, s00@D00 and s00@D09 are the positioning errors in the same servo sector. However, these positioning errors correspond to the writing start sector and writing end sector of track X.

Therefore, these values are not equal to each other in general. When the values are not equal to each other, and s00@D09 is closer to the next writing track than s00@D00 (Yes in block B15), the CPU 26 overwrites or renews s00@D00 by s00@D09 in the positioning error table 32 (block B16). In this manner, at the time of the D17 writing of the next track X+1, s00@D09 which is closer to the next track X+1 is adopted for the first or second narrowing prevention control. When positioning error s00@D09 of the servo sector immediately after written data sector D09 is not closer to the next writing track than extraction result s00@D00 (No in block B15), the process is finished.

As described above, according to the second embodiment, the following effect can be obtained: the possibility of deleting the written information is reduced by adopting the positioning error which is the closest to the next track and renewing the positioning error table 32 when there is multiple positioning errors in the same servo sector.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk apparatus comprising:
a magnetic disk having a plurality of tracks, each of the plurality of tracks comprising a plurality of servo areas including position information and a plurality of data areas, the plurality of servo areas and the plurality of data areas being alternately arranged respectively;
a magnetic head for writing and reading data relative to the magnetic disk; and
a processor, wherein
when recording data in a data area of a first track, by reading the position information of the servo areas of the first track by the magnetic head, the processor detects a positioning error indicating difference from a target writing position of the first track for each of the servo areas,
stores the detected positioning error for each of the servo areas in a storage portion,
when a plurality of positioning errors related to one servo area are present in the positioning errors of the first track in the storage portion, updates the positioning error of the one servo area with a positioning error closest to a second track that is next to the first track, and
writes data in the second track by a shingled write recording system by using the updated positioning error.

2. The magnetic disk apparatus of claim 1, wherein
the processor calculates a track width of a writing target data area of the second track based on the stored positioning error of the written first track in the storage portion, a target track pitch and a positioning error of the second track which is currently written, and when the track width does not satisfy a predetermined value, suspends data writing of the wiring target data area, and
in the storage portion, from the plurality of positioning errors relative to the servo area of the first track adjacent to a servo area provided at an end of the writing target data area of the second track, the positioning error closest to the second track is used as the positioning error of the first track in calculation of the track width of the writing target data area.

3. The magnetic disk apparatus of claim 2, wherein
the servo area having the plurality of positioning errors is a servo area of the first track adjacent to a servo area immediately before the writing target data area of the second track.

4. The magnetic disk apparatus of claim 2, wherein
the servo area having the plurality of positioning errors is a servo area of the first track adjacent to a servo area immediately after the writing target data area of the second track.

5. The magnetic disk apparatus of claim 1, wherein
the processor calculates a track width of a writing target data area of the second track based on the stored positioning error of the written first track in the storage portion, a target track pitch and a positioning error of the second track which is currently written, and when the track width does not satisfy a predetermined value, suspends data writing of the wiring target data area, and
in the storage portion, the updated positioning error relative to the servo area of the first track adjacent to a servo area provided at an end of the writing target data area of the second track is used as the positioning error of the first track in calculation of the track width of the writing target data area.

6. The magnetic disk apparatus of claim 5, wherein
the servo area having the plurality of positioning errors is a servo area of the first track adjacent to a servo area immediately before the writing target data area of the second track.

7. The magnetic disk apparatus of claim 5, wherein
the servo area having the plurality of positioning errors is a servo area of the first track adjacent to a servo area immediately after the writing target data area of the second track.

8. The magnetic disk apparatus of claim 1, wherein
the processor searches for information of the positioning error of the written first track stored in the storage portion, calculates an correction amount of a writing target radial position of a writing target data area of the second track which is away from the first track by a predetermined distance in parallel with the first track and which is newly written, and sets a target radial position, and
in the storage portion, from the plurality of positioning errors relative to the servo area of the first track adjacent to a servo area provided at an end of the writing target data area of the second track, the positioning error closest to the second track is used in calculation of the correction amount of the writing target radial position of the writing target data area.

9. The magnetic disk apparatus of claim 8, wherein
the servo area having the plurality of positioning errors is a servo area of the first track adjacent to a servo area immediately before the writing target data area of the second track.

10. The magnetic disk apparatus of claim 8, wherein
the servo area having the plurality of positioning errors is a servo area of the first track adjacent to a servo area immediately after the writing target data area of the second track.

11. The magnetic disk apparatus of claim 1, wherein
the processor searches for information of the positioning error of the written first track stored in the storage portion, calculates an correction amount of a writing target radial position of a writing target data area of the second track which is away from the first track by a predetermined distance in parallel with the first track and which is newly written, and sets a target radial position, and
in the storage portion, the updated positioning error relative to the servo area of the first track adjacent to a servo area provided at an end of the writing target data area of the second track is used in calculation of the correction amount of the writing target radial position of the writing target data area.

12. The magnetic disk apparatus of claim 11, wherein the servo area having the plurality of positioning errors is a servo area of the first track adjacent to a servo area immediately before the writing target data area of the second track.

13. The magnetic disk apparatus of claim 11, wherein the servo area having the plurality of positioning errors is a servo area of the first track adjacent to a servo area immediately after the writing target data area of the second track.

14. A data writing method in a magnetic disk apparatus comprising: a magnetic disk having a plurality of tracks, each of the plurality of tracks comprising a plurality of servo areas including position information and a plurality of data areas, the plurality of servo areas and the plurality of data areas being alternately arranged respectively; and a magnetic head for writing and reading data relative to the magnetic disk, the method comprising:
 detecting a positioning error indicating difference from a target writing position of a first track for each of the servo areas by reading the position information of the servo areas of the first track by the magnetic head when recording data in a data area of the first track;
 storing the detected positioning error for each of the servo areas;
 when a plurality of positioning errors related to one servo area are present in the stored positioning errors of the first track, updating the positioning error of the one servo area with a positioning error closest to a second track that is next to the first track; and
 writing data in the second track by a shingled write recording system by using the updated positioning error.

15. The method of claim 14, wherein
 the writing data includes calculating a track width of a writing target data area of the second track based on the stored positioning error of the written first track, a target track pitch and a positioning error of the second track which is currently written, and suspending data writing of the writing target data area when the track width does not satisfy a predetermined value, and
 from the stored plurality of positioning errors relative to the servo area of the first track adjacent to a servo area provided at an end of the writing target data area of the second track, the positioning error closest to the second track is used as the positioning error of the first track in calculation of the track width of the writing target data area.

16. The method of claim 14, wherein
 the writing data includes calculating a track width of a writing target data area of the second track based on the stored positioning error of the written first track, a target track pitch and a positioning error of the second track which is currently written, and suspending data writing of the writing target data area when the track width does not satisfy a predetermined value, and
 the updated positioning error relative to the servo area of the first track adjacent to a servo area provided at an end of the writing target data area of the second track is used as the positioning error of the first track in calculation of the track width of the writing target data area.

17. The method of claim 14, wherein
 the writing data includes searching for information of the stored positioning error of the written first track, calculating a correction amount of a writing target radial position of a writing target data area of the second track which is away from the first track by a predetermined distance in parallel with the first track and which is newly written, and setting a target radial position, and
 from the stored plurality of positioning errors relative to the servo area of the first track adjacent to a servo area provided at an end of the writing target data area of the second track, the positioning error closest to the second track is used in calculation of the correction amount of the writing target radial position of the writing target data area.

18. The method of claim 14, wherein
 the writing data includes searching for information of the stored positioning error of the written first track, calculating a correction amount of a writing target radial position of a writing target data area of the second track which is away from the first track by a predetermined distance in parallel with the first track and which is newly written, and setting a target radial position, and
 the updated positioning error relative to the servo area of the first track adjacent to a servo area provided at an end of the writing target data area of the second track is used in calculation of the correction amount of the writing target radial position of the writing target data area.

* * * * *